(12) United States Patent
Okamoto et al.

(10) Patent No.: US 6,363,469 B1
(45) Date of Patent: Mar. 26, 2002

(54) ADDRESS GENERATION APPARATUS

(75) Inventors: Minoru Okamoto, Suita; Hidetoshi Suzuki, Yokosuka, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/351,733

(22) Filed: Jul. 12, 1999

(30) Foreign Application Priority Data

Jul. 13, 1998 (JP) .......................................... 10-197064

(51) Int. Cl.[7] .............................. G06F 9/34; G06F 12/02
(52) U.S. Cl. ........................ 711/220; 711/214; 711/213
(58) Field of Search ................................ 711/212, 213, 711/214, 215, 217, 220, 219; 712/211, 241

(56) References Cited

U.S. PATENT DOCUMENTS

| 4,924,377 A | * | 5/1990 | Kuriyama et al. | 712/205 |
| 4,974,146 A | * | 11/1990 | Works et al. | 712/14 |
| 5,903,910 A | * | 5/1999 | Tran | 711/132 |
| 6,112,293 A | * | 8/2000 | Witt | 712/216 |

FOREIGN PATENT DOCUMENTS

| JP | 60-129853 | 11/1985 |
| JP | 8-274597 | 10/1996 |

* cited by examiner

*Primary Examiner*—Matthew M. Kim
*Assistant Examiner*—Denise Tran
(74) *Attorney, Agent, or Firm*—Renner, Otto, Boisselle & Sklar

(57) ABSTRACT

An address generation apparatus for generating a first address and a second address includes a first register for storing a first reference address; a second register for storing a second reference address; a third register for storing a first offset value with respect to the first reference address, the first offset value being designated by an instruction; a fourth register for storing a second offset value with respect to the second reference address, the second offset value being designated by the instruction; a first adder for adding the first reference address stored in the first register and the first offset value stored in the third register; a second adder for adding the second reference address stored in the second register and the second offset value stored in the fourth register; a fifth register for storing an output from the first adder as the first address; and a sixth register for storing an output from the second adder as the second address.

4 Claims, 6 Drawing Sheets

ADDRESS GENERATION APPARATUS

BACKGROUND OF THE INVENTION

1. Field of the Invention

The present invention relates to an address generation apparatus for generating an address, and in particular, to an address generation apparatus for generating an address which indicates a position of data in a memory, the position being used for accessing the data stored in the memory.

2. Description of the Related Art

Recently, DSPs (digital signal processors) have been widely used as the field of digital signal processing has expanded. A DSP reads a plurality of pieces of data (typically, two systems of data) stored in a memory and executes various operations (e.g., multiplication and addition) on the plurality of pieces of data. In order to access the data stored in the memory, an address indicating the position of the data in the memory is used. For accessing the plurality of pieces of data stored in the memory, the DSP usually has a plurality of special registers storing a plurality of addresses, respectively. For example, two addresses are output to the memory from two special registers. As a result, two pieces of data corresponding to the two addresses are output from the memory. A prescribed operation is performed on the two pieces of data.

FIG. 4 shows a structure of a conventional address generation apparatus 900. The address generation apparatus 900 includes an address register file 910 and a modifying register file 940.

The address register file 910 includes a plurality of registers, for example, four 16-bit registers (hereinafter, referred to as "registers R0, R1, R2 and R3").

The modifying register file 940 includes a plurality of registers, for example, four 16-bit registers (hereinafter, referred to as "register MR0, MR1, MR2 and MR3").

FIG. 5 shows an exemplary arrangement of data groups stored in a data memory 950 (FIG. 4). In the example shown in FIG. 5, six data groups, i.e., data groups A through data groups F are stored in the data memory 950.

With reference to FIGS. 4 and 5, an operation of the address generation apparatus 900 will be described.

A leading address of the data group A is stored in advance in the register R0 in the address register file 910. A leading address of the data group B is stored in advance in the register R1 in the address register file 910. The address generation apparatus 900 outputs the contents of the registers R0 and R1 to the data memory 950 as addresses 920 and 922. The data memory 950 outputs data stored at a position designated by the address 920 to a data bus 960, and outputs data stored at a position designated by the address 922 to a data bus 962. A data processing unit 970 performs a prescribed operation on the two pieces of data output to the data buses 960 and 962.

An adder 930 adds the contents in the address 920 and the register MR0 and writes the addition result into the register R0. Thus, the content of the register R0 is updated.

An adder 932 adds the contents in the address 922 and the register MR1 and writes the addition result into the register R1. Thus, the content of the register R1 is updated.

For example, when the content of each of the registers MR0 and MR1 is "1", the content of each of the registers R0 and R1 is incremented by 1. In accordance with the output from the register R0 (i.e., address 920), the data is sequentially read from the leading address of the data group A stored in the data memory 950. In accordance with the output from the register R1 (i.e., address 922), the data is sequentially read from the leading address of the data group B stored in the data memory 950. Thus, a prescribed operation is performed on the data in the data group A and the data in the data group B.

For performing a prescribed operation on data in data group C and data in data group D stored in the data memory 950, a leading address of the data group C is stored in advance in the register R2 and a leading address of the data group D is stored in advance in the register R3. In a similar manner to that described above, data in the data group C and data in the data group D are read from the data memory 950 and a prescribed operation is performed on the two pieces of data read from data memory 950.

For performing a prescribed operation on data in data group E and data in data group F stored in the data memory 950, contents of registers R0 and R1 need to be newly set in the following manner.

In the case where the content of the register R0 is necessary, the content is pushed onto the data memory 950 through the data bus 960. In the case where the content of the register R1 is necessary, the content is pushed onto the data memory 950 through the data bus 960. Then, a leading address of the data group E is stored in the register R0, and a leading address of the data group F is stored in the register R1. Next, in a similar manner to that described above, data in the data group E and data in the data group F are read from the data memory 950, and a prescribed operation is performed on the two pieces of data read from the data memory 950. (See, for example, "DSP 56116 User's Manual", Motorola Japan, Ltd. (1992), page 26.)

In the above-described conventional technology, the contents of the registers R0 and R1 need to be pushed before the leading addresses of the data groups E and F are stored in the registers R0 and R1. This involves a problem in that additional steps are required to set a leading address of a data group in a register included in the address register file 910.

FIG. 6 shows an exemplary program for generating an address using the conventional address generation apparatus 900, in which the above-described problem is conspicuous. In FIG. 6, "LOOP" is an instruction to execute an instruction subsequent to "LOOP" repeatedly, and "ENDLOOP" is an instruction to terminate the repeated execution. "LOOP X" represents that an instruction between LOOP X and END-LOOP is executed X times. As shown in FIG. 6, when the leading addresses of the data groups are set in the registers R0 and R1 using a double loop, at least 6×X×N steps are required to set the leading addresses. This significantly lowers the operating efficiency of the DSP.

The number of steps required to set the leading addresses of the data groups can be reduced by increasing the number of registers included in the address register file 910. However, when the number of registers included in the address register file 910 is increased, the circuit delay by a selection circuit (included in the address register file 910) for outputting the addresses 920 and 922 is extended. Accordingly, such a solution is not suitable for a high speed operation. Furthermore, such an increase in the number of registers increases the number of signals written in the register, resulting in an increase in power consumption.

SUMMARY OF THE INVENTION

An address generation apparatus for generating a first address and a second address according to the present invention includes a first register for storing a first reference address; a second register for storing a second reference address; a third register for storing a first offset value with respect to the first reference address, the first offset value being designated by an instruction; a fourth register for storing a second offset value with respect to the second reference address, the second offset value being designated by the instruction; a first adder for adding the first reference address stored in the first register and the first offset value stored in the third register; a second adder for adding the second reference address stored in the second register and the second offset value stored in the fourth register; a fifth register for storing an output from the first adder as the first address; and a sixth register for storing an output from the second adder as the second address.

In one embodiment of the invention, the first reference address is a leading address of one of a plurality of data groups stored in a data memory, and the second reference address is a leading address of another one of the plurality of data groups stored in the data memory.

In one embodiment of the invention, the instruction includes a first immediate value section and a second immediate value section, and the first offset value is designated by the first immediate value section and the second offset value is designated by the second immediate value section.

In one embodiment of the invention, the addition performed by the first adder and the storage of the output from the first adder to the fifth register, and the addition performed by the second adder and the storage of the output from the second adder to the sixth register are achieved by executing the instruction.

Thus, the invention described herein makes possible the advantage of providing an address generation apparatus for efficiently generating an address of data in a memory.

This and other advantages of the present invention will become apparent to those skilled in the art upon reading and understanding the following detailed description with reference to the accompanying figures.

DESCRIPTION OF THE EMBODIMENTS

Hereinafter, the present invention will be described by way of Illustrative examples with reference to the accompanying drawings.

Figure 1:
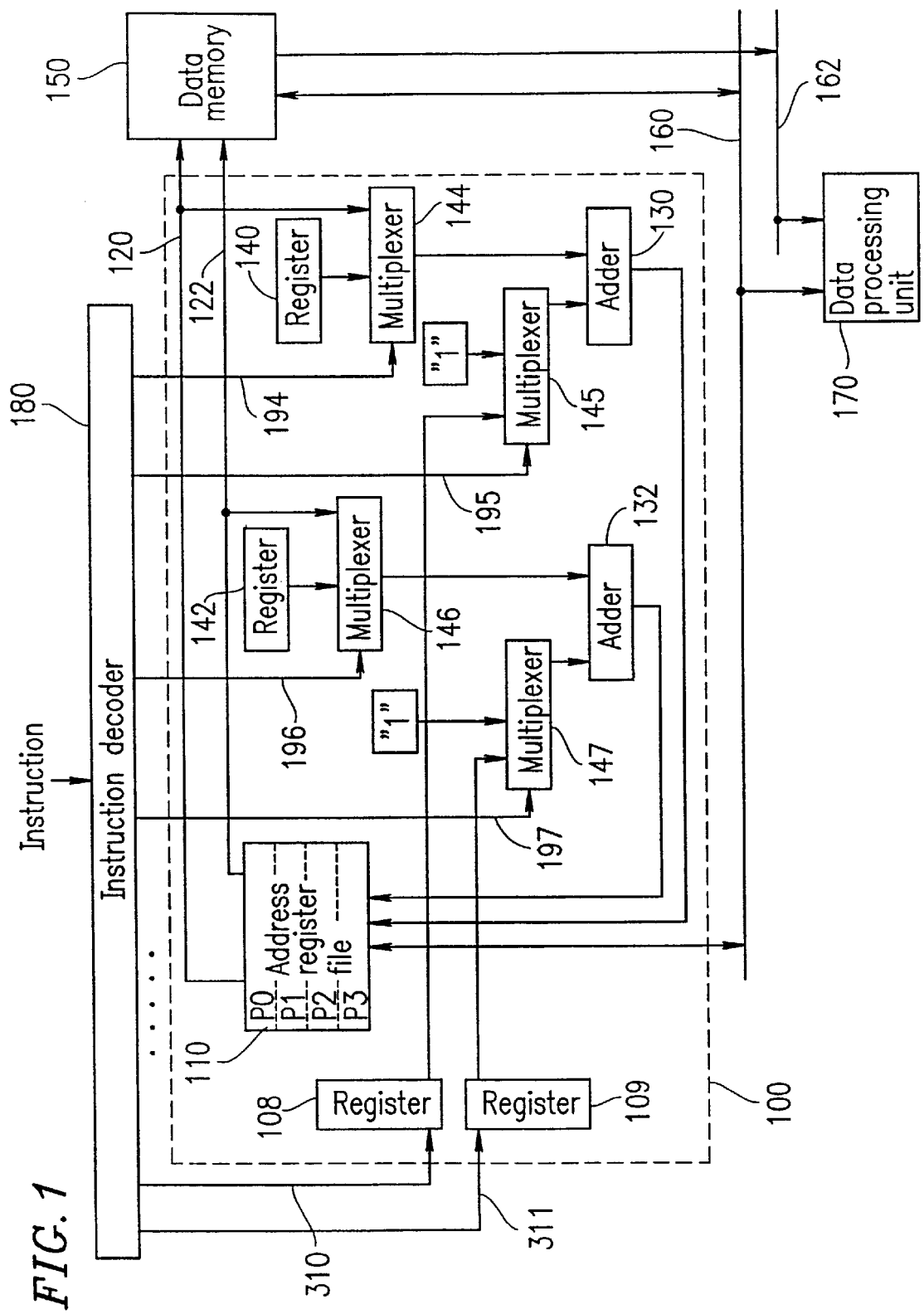
FIG. 1 shows a structure of an address generation apparatus 100 In an example according to the present invention.

FIG. 1 shows a structure of an address generation apparatus 100 in an example according to the present invention. The address generation apparatus 100 includes an address register file 110.

The address register file 110 includes a plurality of registers, for example, for 16-bit registers (hereinafter, referred to as "registers P0, P1, P2 and P3").

Figure 2:
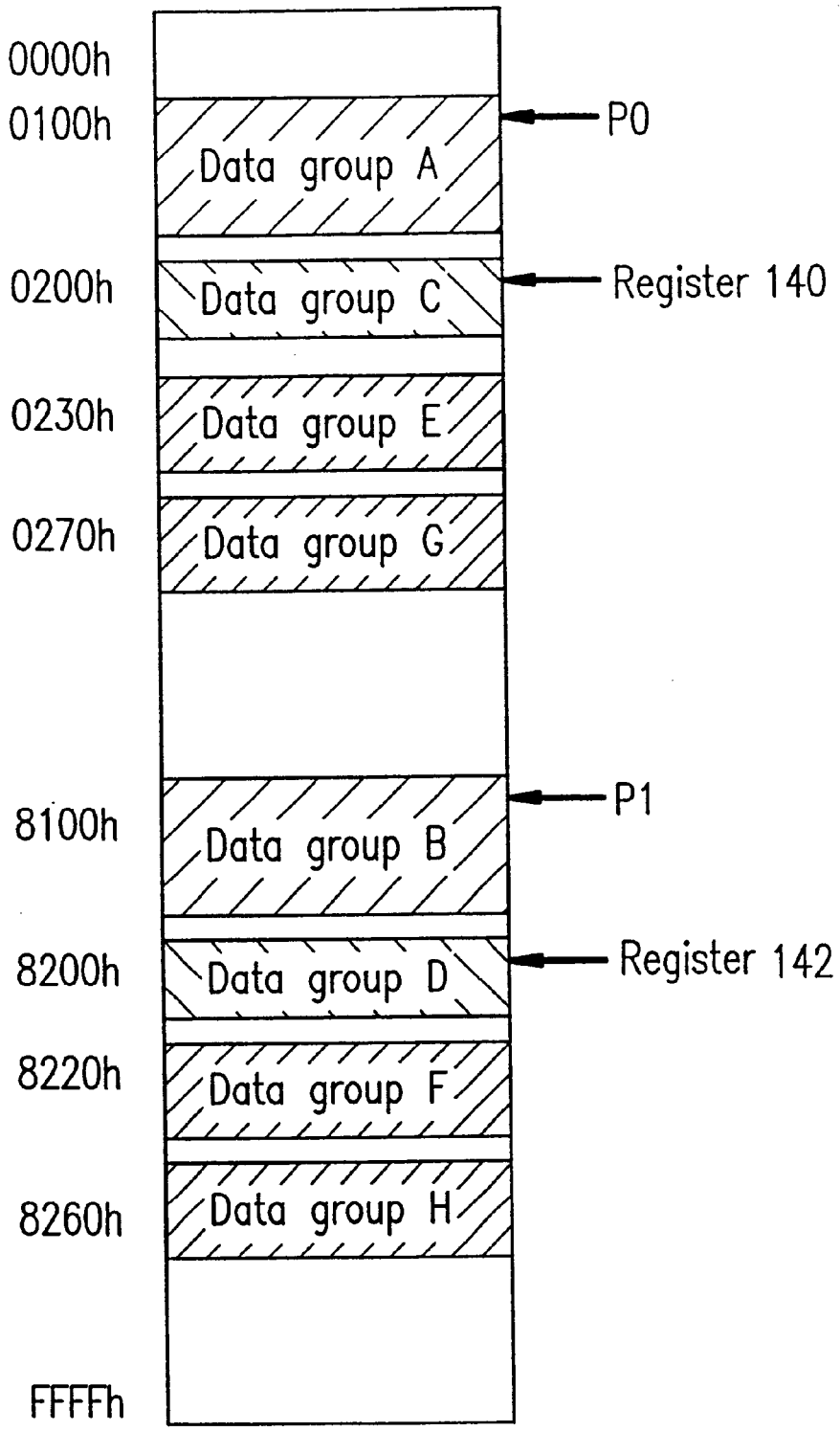
FIG. 2 shows an exemplary arrangement of data groups stored in a data memory 150 in the address generation apparatus 100 shown in FIG. 1.

FIG. 2 shows an exemplary arrangement of data groups stored in a data memory 150. In the example shown in FIG. 2, eight data groups, i.e., data groups A through H, are stored in the data memory 150.

Hereinafter, with reference to FIGS. 1 and 2, an exemplary operation of the address generation apparatus 100 will be described. In the following description, an operation is executed in a data processing unit 170 on each of the data groups A and B, the data groups C and D, the data groups E and F, and the data groups G and H.

A leading address of the data group A (0100h in the example shown in FIG. 2) is stored in advance in the register P0 in the address register file 110. A leading address of the data group B (8100h in the example shown in FIG. 2) is stored in advance in the register P1 in the address register file 110.

A first reference address is stored in advance in a first register 140. The first reference address is, for example, a leading address of the data group C (0200h in the example shown in FIG. 2). A second reference address is stored in advance in a second register 142. The second reference address is, for example, a leading address of the data group D (8200h in the example shown in FIG. 2). The first reference address and the second reference address can be supplied to the first register 140 and the second register 142 respectively through, for example, a data bus 160.

Hereinafter, an exemplary operation of the address generation apparatus 100 for subsequently reading the data in the data group A and the data in the data group B from the data memory 150 will be described.

The address generation apparatus 100 outputs the contents of the registers P0 and P1 to the data memory 150 as addresses 120 and 122, respectively. The data memory 150 outputs data stored at a position designated by the address 120 to the data bus 160, and outputs data stored at a position designated by the address 122 to a data bus 162. For example, the address 120 is a leading address of the data group A (0100h in the example shown in FIG. 2), and the address 122 is a leading address of the data group B (8100h in the example shown in FIG. 2). In this case, the data memory 150 outputs the data at 0100h and data at 8100h.

The addresses 120 and 122 are supplied to adders 130 and 132 through multiplexers 144 and 146, respectively. The adder 130 adds "1" to the address 120, and the adder 132 adds "1" to the address 122. the outputs from the adders 130 and 132 are respectively stored in the registers P0 and P1. As a result, the content of the register P0 is updated to 0101h, and the content of the register P1 is updated to 8101h.

By repeating the above-described operation, the data in the data group A and the data in the data group B are subsequently read from the data memory 150. The data in the data group A read from the data memory 150 is supplied to the data processing unit 170 through the data bus 160. The data in the data group B read from the data memory 150 is supplied to the data processing unit 170 through the data bus 162. The data processing unit 170 executes a prescribed operation on the data in the data group A and the data in the data group B.

Next, an exemplary operation of the address generation apparatus 100 for subsequently reading the data in the data group C and the data in the data group D from the data memory 150 will be described. In order to read the data in the data group C and the data in the data group D from the data memory 150, a specific instruction (hereinafter, referred to as an "MOD2P" instruction) is used.

Figure 3:
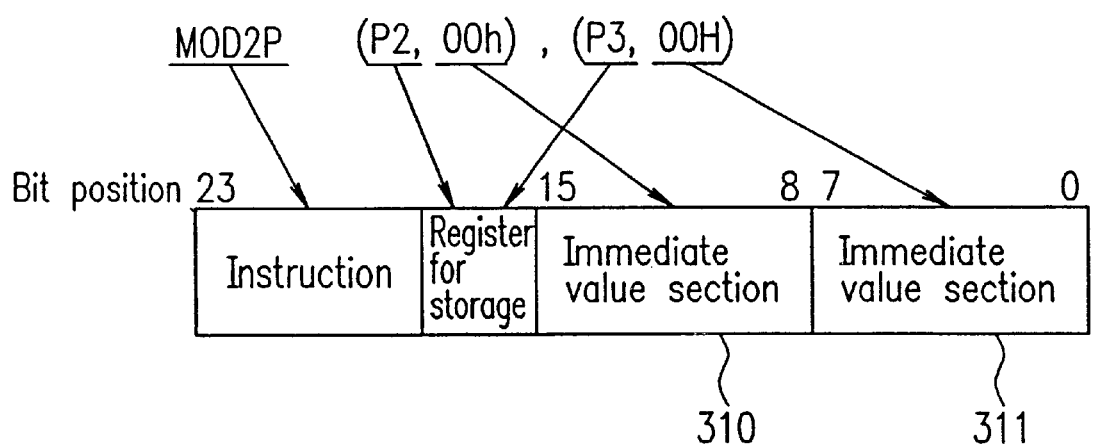
FIG. 3 shows a structure of an instruction code of an "MOD2P" instruction.
Figure 4:
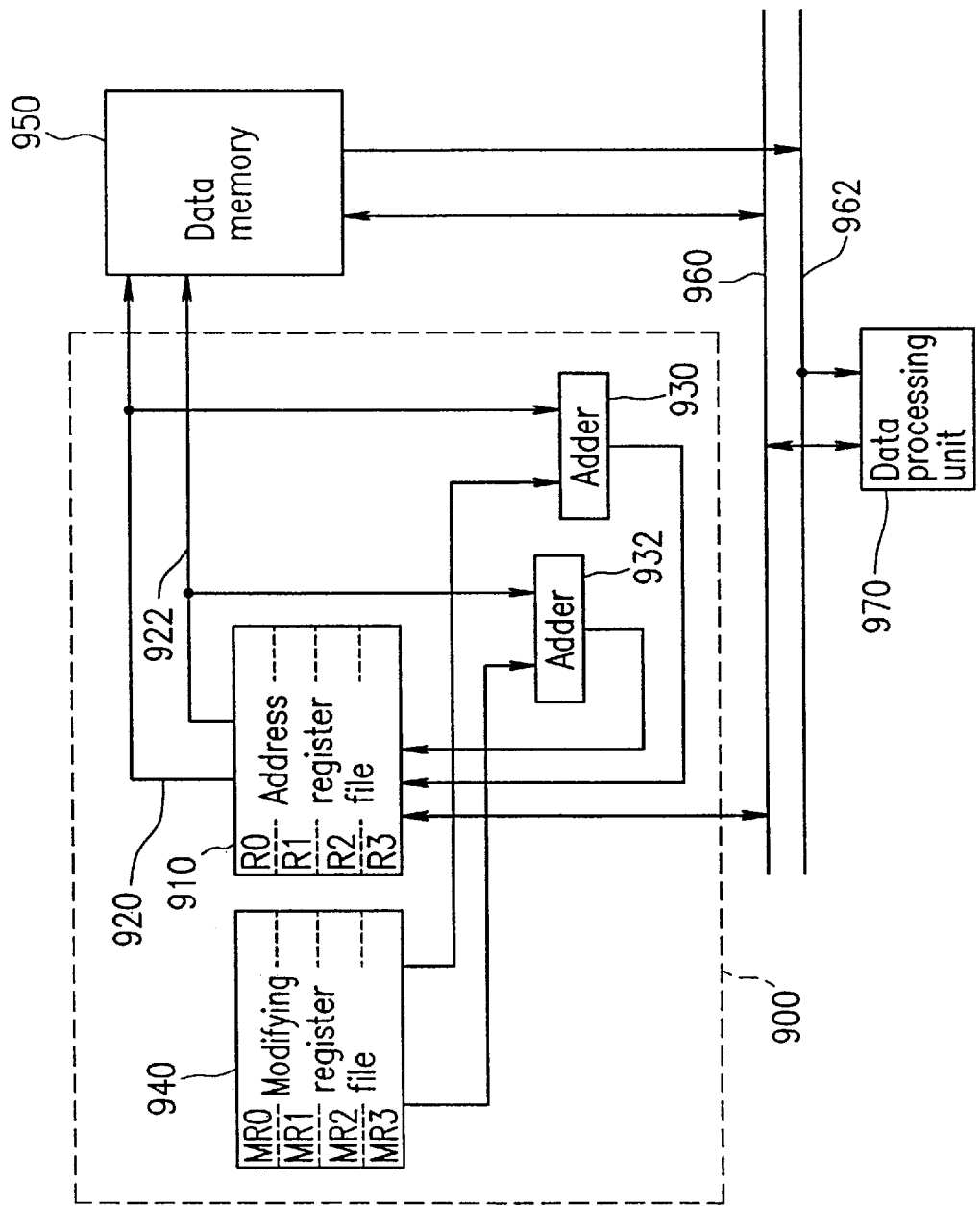
FIG. 4 shows a structure of a conventional address generation apparatus 900.
Figure 5:
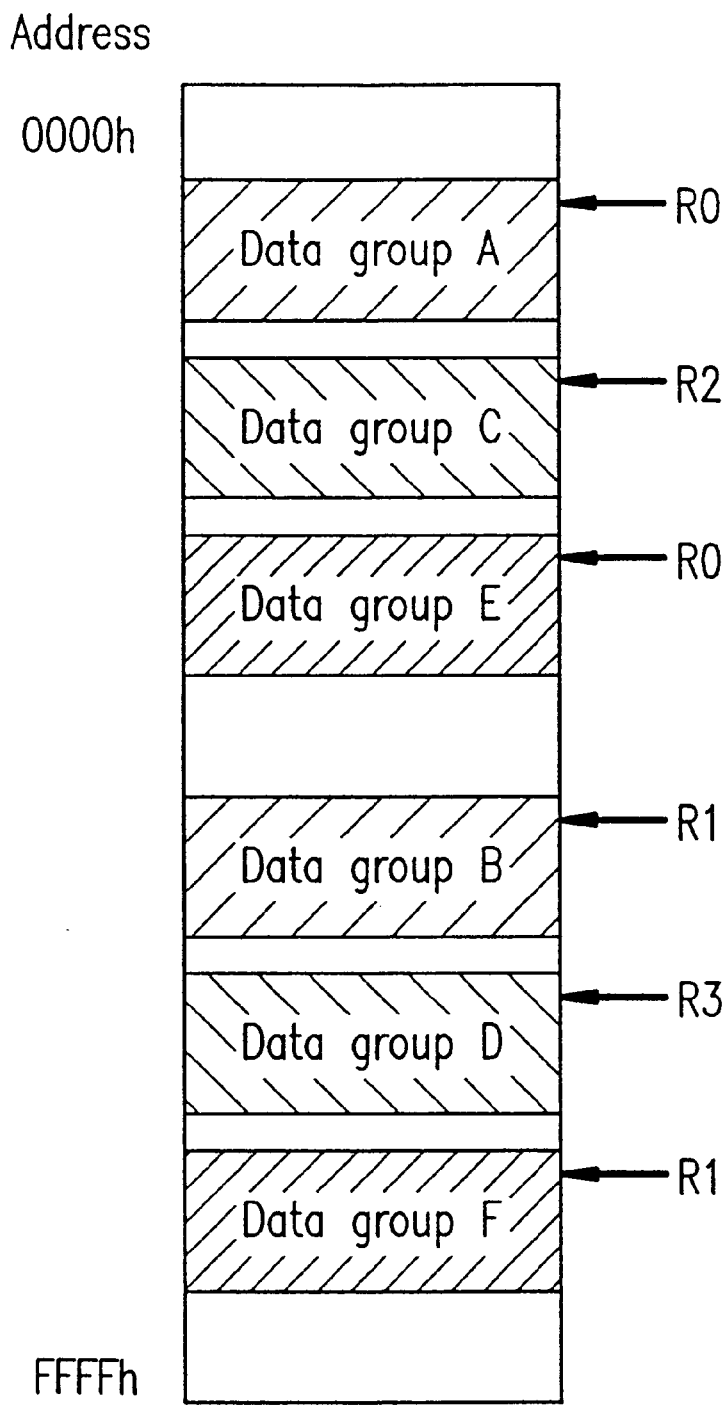
FIG. 5 shows an exemplary arrangement of data groups stored in a data memory 950 in the address generation apparatus 900 shown in FIG. 4.
Figure 6:
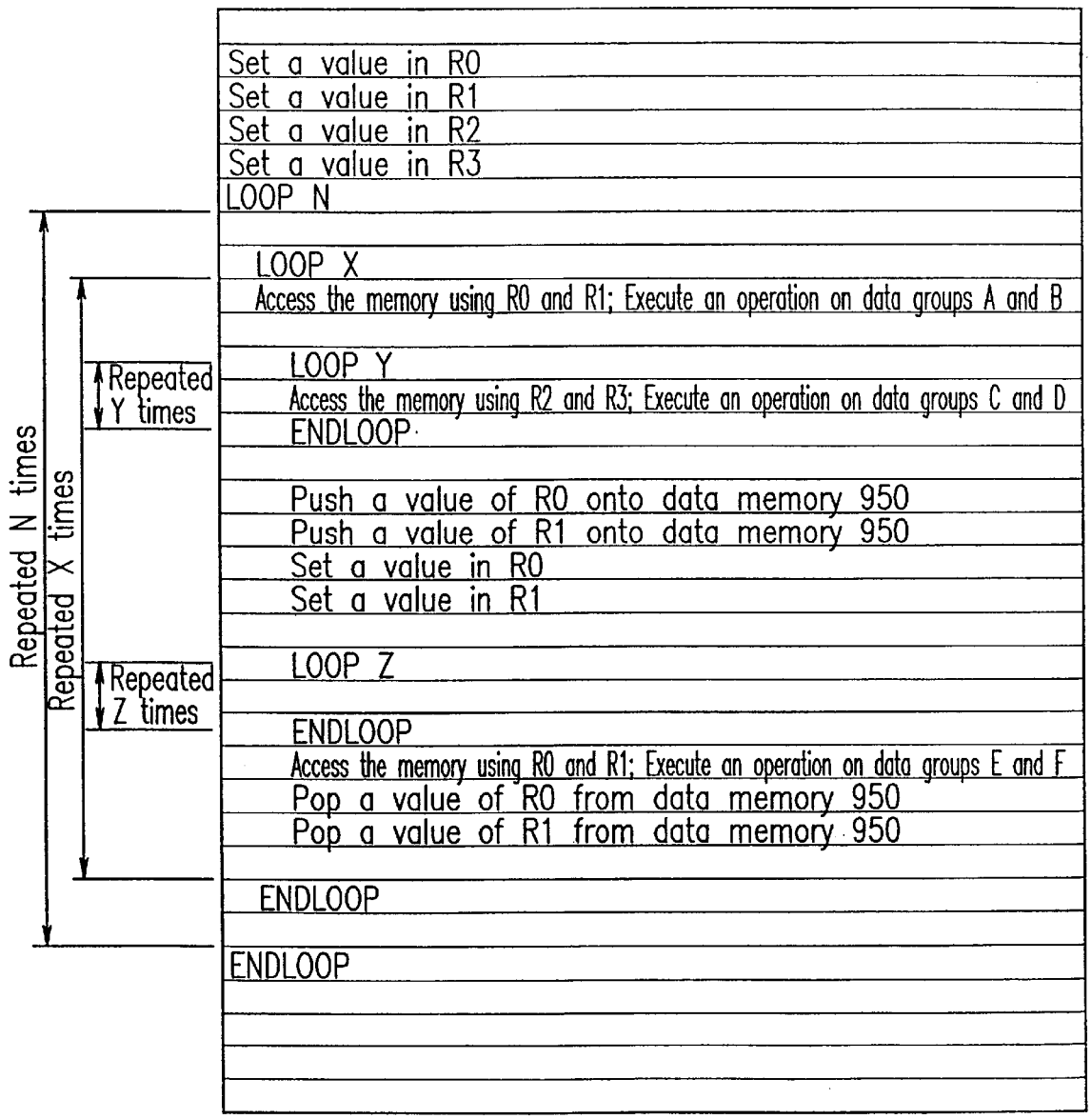
FIG. 6 shows an exemplary program for generating an address using the conventional address generation apparatus 900.

FIG. 3 shows a structure of an instruction code of the "MOD2P" instruction. The "MOD2P" instruction includes an immediate value section 310 and an immediate value section 311.

The instruction length of the "MOD2P" instruction is 24 bits. The immediate value section 310 is assigned to bit 15 through bit 8, and the immediate value section 311 is assigned to bit 7 through bit 0.

The "MOD2P" instruction is represented as, for example, "MOD2P (P2, 00h), (P3, 00h)". This refers to that the value of the immediate value section 310 is 00h, and the value of the immediate value section 311 is 00h.

The "MOD2P" instruction is decoded by an instruction decoder 180. The instruction decoder 180 outputs various control signals. The various signals include control signals 194 through 197 (FIG. 1) supplied to multiplexers 144 through 147. The various signals also include write enable signals supplied to the first register 140 and the second register 142.

When the "MOD2P" instruction is decoded by the instruction decoder 180, the instruction decoder 180 stores the value of the immediate value section 310 of the "MOD2P" instruction in a third register 108, and stores the value of the immediate value section 311 of the "MOD2P" instruction in a fourth register 109 The value of the immediate value section 310 is used as a first offset value with respect to the first reference address stored in the first register 140. The value of the immediate value section 311 is used as a second offset value with respect to the second reference address stored in the second register 142.

The instruction decoder 180 further supplies the control signals 194 through 197 to the multiplexers 144 through 147. When the "MOD2P" instruction is decoded by the instruction decoder 180, the multiplexer 144 is controlled by the control signal 194 to select the first register 140, and the multiplexer 145 is controlled by the control signal 195 to select the third register 108. The multiplexer 146 is controlled by the control signal 196 to select the second register 142, and the multiplexer 147 is controlled by the control signal 197 to select the fourth register 109.

As a result, the adder 130 adds the output from the first register 140 and the output from the third register 108. The adder 132 adds the output from the second register 142 and the output from the fourth register 109.

For example, in the case where 0200h is stored in the first register 140 as the first reference address and 00h is stored in the third register 108 as the first offset value with respect to the first reference address, the adder 130 performs the addition (0200h+00h). The addition result, 0200h, is output to the register P2 in the address register file 110.

For example, in the case where 8200h is stored in the second register 142 as the second reference address and 00h is stored in the fourth register 109 as the second offset value with respect to the second reference address, the adder 132 performs the addition (8200h+00h). The addition result, 8200h, is output to the register P3 in the address register file 110.

Thus, the leading address of the data group C is stored in the register P2, and the leading address of the data group D is stored in the register P3.

Then, the contents of the registers P0 and P1 are output to the data memory 150 as the addresses 120 and 122, respectively. In this case, 0200h is output as the address 120, and 8200h is output as the address 122.

The multiplexer 144 is controlled by the control signal 194 to select the address 120, and the multiplexer 145 is controlled by the control signal 195 to select "1". The multiplexer 146 is controlled by the control signal 196 to select the address 122, and the multiplexer 147 is controlled by the control signal 197 to select "1".

As a result, the adder 130 adds "1" to the address 120. The addition result is output to the register P2 in the address register file 110. The adder 132 adds "1" to the address 122. The addition result is output to the register P3 in the address registers file 110. In this manner, the contents of the registers P2 and P3 are each incremented one by one. Thus, the data in the data group C and the data in the data group D are sequentially read.

Next, an exemplary operation of the address generation apparatus 100 for subsequently reading the data in the data group E and the data in the data group F from the data memory 150 will be described. In order to read the data in the data group E and the data in the data group F from the data memory 150, the "MOD2P" instruction is used.

The "MOD2P" instruction is represented as, for example, "MOD2P (P2, 30h), (P3, 20h)". This refers to that the value of the immediate value section 310 is 30h, and the value of the immediate value section 311 is 20h.

When the "MOD2P" instruction is decoded by the instruction decoder 180, the instruction decoder 180 stores the value of the immediate value section 310 of the "MOD2P" instruction in the third register 108, and stores the value of the immediate value section 311 of the "MOD2P" instruction in the fourth register 109. The instruction decoder 180 further supplies the control signals 194 through 197 to the multiplexers 144 through 147. When the "MOD2P" instruction is decoded by the instruction decoder 180, the multiplexer 144 is controlled by the control signal 194 to select the first register 140, and the multiplexer 145 is controlled by the control signal 195 to select the third register 108. The multiplexer 146 is controlled by the control signal 196 to select the second register 142, and the multiplexer 147 is controlled by the control signal 197 to select the fourth register 109.

As a result, the adder 130 adds the output from the first register 140 and the output from the third register 108. The adder 132 adds the output from the second register 142 and the output from the fourth register 109.

For example, in the case where 0200h is stored in the first register 140 as the first reference address and 30h is stored in the third register 108 as the first offset value with respect to the first reference address, the adder 130 performs the addition (0200h+30h). The addition result, 0230h , is output to the register P2 in the address register file 110.

For example, in the case where 8200h is stored in the second register 142 as the second reference address and 20h is stored in the fourth register 109 as the second offset value with respect to the second reference address, the adder 132 performs the addition (8200h+20h). The addition result, 8220h, is output to the register P3 in the address register file 110.

Thus, the leading address of the data group E is stored in the register P2, and the leading address of the data group F is stored in the register P3.

Then, the contents of the registers P0 and P1 are output to the data memory 150 as the addresses 120 and 122, respectively. In this case, 0230h is output as the address 120, and 8220h is output as the address 122.

The multiplexer 144 is controlled by the control signal 194 to select the address 120, and the multiplexer 145 is controlled by the control signal 195 to select "1". The multiplexer 146 is controlled by the control signal 196 to select the address 122, and the multiplexer 147 is controlled by the control signal 197 to select "1".

As a result, the adder 130 adds "1" to the address 120. The addition result is output to the register P2 in the address register file 110. The adder 132 adds "1" to the address 122. The addition result is output to the register P3 in the address register file 110. In this manner, the contents of the registers P2 and P3 are each incremented one by one. Thus, the data in the data group E and the data in the data group F are sequentially read.

The address generation apparatus 100 operates in a similar manner for subsequently reading the data in the data group G and the data in the data group H from the data memory 150. In order to read the data in the data group G and the data in the data group H from the data memory 150, the "MOD2P" instruction is used.

The "MOD2P" instruction is represented as, for example, "MOD2P (P2, 70h), (P3, 60h)", This refers to that the value of the immediate value section 310 is 70h, and the value of the immediate value section 311 is 60h. By executing the "MOD2P" instruction, a leading address of the data group G (0270h) is stored in the register P2 and a leading address of the data group H (8260h) is stored in the register P3.

According to the present invention, the address 120 is generated based on an addition result of the first reference address stored in the first register 140 and the first offset value designated by the "MOD2P" instruction, and the address 122 is generated based on an addition result of the second reference address stored in the second register 142 and the second offset value designated by the "MOD2P" instruction. Thus, even when the number of data groups stored in the data memory 150 on which an operation is to be executed is larger than the number of registers in the address register file 110, the content of the register in the address register file 110 does not need to be pushed onto the data memory 150. Accordingly, the addresses 120 and 122 used for accessing data in the data memory 150 can be generated efficiently.

The first reference address and the second reference address are not limited to the leading addresses of the data groups stored in the data memory 150. The first reference address can have an arbitrary value as a base address with respect to the first offset value. The second reference address can have an arbitrary value as a base address with respect to the second offset value.

The data in the data group A can be read using an address 120 generated based on an addition result of the first reference address stored in the first register 140 and the first offset value designated by the "MOD2P" instruction, and the data in the data group B can be read using an address 122 generated based on an addition result of the second reference address stored in the second register 142 and the second offset value designated by the "MOD2P" instruction. In this case, the address register file 110 can include only two registers.

As described above, by executing the "MOD2P" instruction, the addition performed by the adder 130 and the addition performed by the adder 132 are performed simultaneously, and the storage of the output from the adder 130 to the register P2 and the storage of the output from the adder 132 to the register P3 are performed simultaneously. By providing the "MOD2P" instruction with such a function, the hardware can be configured so that the "MOD2P" instruction is executed in one cycle. By reducing the number of cycles required to set the address, the efficiency of address setting can be significantly improved.

The representation of the "MOD2P" instruction is not limited to the ones described above. The representation of the "MOD2P" instruction is arbitrary as long as a similar function to that described above is obtained.

Although the first register 140 and the second register 142 are provided independently from the address register file 110 in the above example, the first register 140 and the second register 142 can be arbitrary two registers in the address register file 110. In this case, by executing the "MOD2P" instruction, for example, the content of the register P0 and the value of the immediate value section 310 are added together and the addition result is stored in the register P2, and the content of the register P1 and the value of the immediate value section 311 are added together and the addition result is stored in the register P3.

The structure of the Instruction code of the "MOD2P" instruction is not limited to the one shown in FIG. 3. The instruction code of the "MOD2P" instruction can have an arbitrary structure as long as the function of executing immediate value addition of adding an immediate value to the content of each of two or more registers in one step and storing the addition results to the two or more registers respectively is achieved.

In the above example, the registers in the address register files 110 are referred to as P0, P1, P2 and P3. The registers can be referred to in any other manner.

According to the present invention, a first address is generated based on an addition result of a first reference address stored in a first register and a first offset value designated by an instruction, and a second address is generated based on an addition result of a second reference address stored in a second register and a second offset value designated by the instruction. Thus, even when the number of data groups stored in a data memory on which an operation is to be executed is larger than the number of registers in an address register file, the content of the register in the address register file does not need to be pushed onto the data memory. Accordingly, the first and second addresses used for accessing data in the data memory can be generated efficiently.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An address generation apparatus for generating a first address and a second address after receipt of an instruction designating address offset values, the address generation apparatus comprising:

a first register for pre-storing a first reference address in advance of the instruction;

a second register for pre-storing a second reference address in advance of the instruction;

a third register for storing a first offset value with respect to the first reference address, the first offset value being designated by the instruction;

a fourth register for storing a second offset value with respect to the second reference address, the second offset value being designated by the instruction;

a first adder for adding the first reference address pre-stored in the first register and the first offset value stored in the third register;

a second adder for adding the second reference address pre-stored in the second register and the second offset value stored in the fourth register;

a fifth register for storing an output from the first adder as the first address; and a sixth register for storing an output from the second adder as the second address, wherein the first address and the second address are generated based on the first reference address and the second reference address which are pre-stored prior to the instruction, and the offset values designated in the instruction.

2. An address generation apparatus according to claim 1, wherein the first reference address is a leading address of one of a plurality of data groups stored in a data memory, and the second reference address is a leading address of another one of the plurality of data groups stored in the data memory.

3. An address generation apparatus according to claim 1, wherein the instruction includes a first immediate value section and a second immediate value section, and the first offset value is designated by the first immediate value section and the second offset value is designated by the second immediate value section.

4. An address generation apparatus according to claim 1, wherein the addition performed by the first adder and the storage of the output from the first adder to the fifth register, and the addition performed by the second adder and the storage of the output from the second adder to the sixth register are achieved by executing the instruction.

* * * * *